United States Patent
Bruas et al.

(10) Patent No.: US 9,130,663 B2
(45) Date of Patent: Sep. 8, 2015

(54) SYSTEM FOR MODIFYING THE CARRIER FREQUENCY

(71) Applicant: THALES, Neuilly-sur-Seine (FR)

(72) Inventors: Patrick Bruas, Livry Gargan (FR); Marc Touret, Colombes (FR)

(73) Assignee: Thales, Courbevoie (FR)

(*) Notice: Subject to any disclaimer, the term of this patent is extended or adjusted under 35 U.S.C. 154(b) by 418 days.

(21) Appl. No.: 13/723,023

(22) Filed: Dec. 20, 2012

(65) Prior Publication Data
US 2013/0163639 A1    Jun. 27, 2013

(30) Foreign Application Priority Data
Dec. 22, 2011 (FR) .................................. 11 04012

(51) Int. Cl.
| | | |
|---|---|---|
| H04L 5/00 | (2006.01) | |
| H04L 7/00 | (2006.01) | |
| H04B 1/715 | (2011.01) | |
| H04B 1/7156 | (2011.01) | |

(52) U.S. Cl.
CPC .............. *H04B 1/715* (2013.01); *H04B 1/7156* (2013.01)

(58) Field of Classification Search
CPC ........... G06F 1/14; G06F 9/4825; G06F 1/04; G06F 11/0757; G06F 11/3419; H04B 1/173; H04B 1/7143; H04B 1/715; H04B 1/7154
USPC .................................. 713/400, 500, 501, 502
See application file for complete search history.

(56) References Cited

U.S. PATENT DOCUMENTS

| | | |
|---|---|---|
| 6,275,518 B1 | 8/2001 | Takahashi et al. |
| 6,278,723 B1 | 8/2001 | Meihofer et al. |
| 2013/0046968 A1* | 2/2013 | Dinan .......................... 713/150 |

* cited by examiner

*Primary Examiner* — Zahid Choudhury
(74) *Attorney, Agent, or Firm* — Baker & Hostetler LLP

(57) ABSTRACT

A system and method for modifying the carrier frequency of first and second signals associated with first and second sequences, respectively, of consecutive time intervals, comprises: first means determining two carrier frequencies respectively associated with each of the two signals based on one time interval or at least two consecutive and continuous time intervals, said time interval(s) belonging to a sequence of consecutive time intervals of known duration; and second means determining a first time interval or at least two first consecutive time intervals belonging to the first sequence, based on a second time interval belonging to the second sequence, by establishing a temporal correspondence between each end of said time interval of said second sequence and an interval of said first sequence including this end. The first means determines said carrier frequencies based on one time interval or at least two consecutive time intervals, belonging to said first sequence.

2 Claims, 2 Drawing Sheets

SYSTEM FOR MODIFYING THE CARRIER FREQUENCY

CROSS-REFERENCE TO RELATED APPLICATION

This application claims priority to foreign French patent application No. FR 1104012, filed on Dec. 22, 2011, the disclosure of which is incorporated by reference in its entirety.

FIELD OF THE INVENTION

System for modifying the carrier frequency of two signals, using an identical carrier frequency hopping mechanism (i.e. the same frequency hopping speed) and occupying the same spectrum-spreading band. The frequency hopping mechanism is furthermore implemented in order that each frequency hop is carried out at the same time for both signals. Both signals may, for example, use orthogonal frequency hopping multiple access (referred to as OFHMA). Each signal is associated respectively with a sequence of consecutive time intervals. Consecutive intervals are understood to mean intervals which follow one another immediately, without interruption. Two intervals belonging to the same sequence have an identical duration, but two intervals associated with two different sequences may have a different duration.

BACKGROUND

Means for determining the carrier frequency using a pseudo-random number generating device are known in the prior art. Pseudo-random number generation is based, inter alia, on a time interval of a sequence of consecutive time intervals. These pseudo-random numbers then serve to determine the carrier frequency to be used, by establishing a correspondence, by means of a table, between the pseudo-random number and a carrier frequency.

A system is known which defines a set of independent spectrum-spreading sub-bands for each signal, with separate and different carriers for each signal. This system prevents interferences between the two signals, since each spectrum-spreading sub-band is used by one signal only. However, this complete separation of the two spectrum-spreading sub-bands used by the two signals reduces the efficiency of the signal by a factor corresponding to the ratio between the spreading of the total spectrum-spreading band used by the two signals and the spreading of the sub-band used by one signal. This is due to the spectrum-spreading processing gains through frequency hopping. In the case where the total band is shared in two identical spreading sub-bands, the efficiency of the signal will be reduced by a factor of two, i.e. 3 dB.

A system implementing the same means for determining the frequency for the two signals is also known. The means for determining the frequency then comprises two carrier frequency tables, the first relating a pseudo-random number with the carrier frequency of the first signal, and the second relating a pseudo-random number with the carrier frequency of the second signal. The correspondence tables are implemented so that the carrier frequencies of the first and second signals are different for the same pseudo-random number. However, if the time intervals of the sequences used by the two signals are not of identical durations, the pseudo-random numbers generated are not identical for both signals. The same frequency therefore risks being used simultaneously by both signals. This solution therefore presents the disadvantage of causing interferences between these two signals.

SUMMARY OF THE INVENTION

The present invention therefore aims to overcome these problems by proposing a system allowing the carrier frequency of two signals using an identical carrier frequency hopping mechanism and occupying the same spectrum-spreading band to be modified without degrading the processing gain or causing interferences between these two signals.

For this purpose, the subject-matter of the invention is a system for modifying the carrier frequency of a first signal associated with a first sequence of consecutive time intervals of duration T1 and of a second signal associated with a second sequence of consecutive time intervals of duration T2. The system comprises first means for determining (101) two carrier frequencies respectively associated with each of the two signals on the basis of one time interval or at least two consecutive and continuous time intervals, said time interval(s) belonging to a sequence of consecutive time intervals of known duration. The system also comprises second means for determining (102) a first time interval or at least two first consecutive time intervals belonging to the first sequence, on the basis of a second time interval belonging to the second sequence, by establishing a temporal correspondence between each end of said time interval of said second sequence and an interval of said first sequence including this end. And, in the system, the first determination means (101) are suitable for determining said carrier frequencies in a synchronized manner for said first and second signals and on the basis of one time interval or at least two consecutive time intervals, said time interval(s) belonging to said first sequence.

This system therefore allows one time interval of the second sequence to be related to one or more time intervals of the first sequence. This relation allows the first carrier frequency determination means to carry out this determination only on the basis of intervals of the first sequence, for either the first or the second signal, thereby guaranteeing the use of different frequencies, at a given time, for the first and second signals.

Advantageously, the second determination means (102) comprise calculation means suitable for calculating said time interval(s) determined by the following relations:

$$\begin{cases} M = PPCM(T1, T2) \\ a = M/T2 \\ d = k \% a \\ P = EntirePart(((d+1)*T2-1)/T1) - EntirePart(d*T2/T1) \\ MH1 = EntirePart(k*T2/T1) \end{cases}$$

in which T1 represents the duration of each of the first intervals of the first sequence, T2 represents the duration of each of the first intervals of the second sequence, k represents the number of said second time interval, P represents the number of said first time intervals, and MH1 represents the number of said first time interval, PPCM(x,y) is the least common multiple of two non-zero integers x and y and represents the smallest strictly positive integer which is both a multiple of x and a multiple of y, y % x represents the remainder of the Euclidean division of x by y and EntirePart(x) represents the entire part of x, i.e. the integer which is immediately less than or equal to x.

Advantageously, the method for modifying the carrier frequency of a first signal associated with a first sequence of consecutive time intervals of duration T1 and of a second signal associated with a second sequence of consecutive time intervals of duration T2 comprises the following steps:

a step of determining a first time interval or at least two first consecutive time intervals belonging to the first sequence, on the basis of a second time interval belonging to the second sequence, by establishing a temporal correspondence between each end of said time interval of said second sequence and an interval of said first sequence including this end, a step of determining two carrier frequencies in a synchronized manner for said first and second signals and respectively associated with each of the two signals on the basis of one time interval or at least two consecutive time intervals, said time interval(s) belonging to said first sequence.

BRIEF DESCRIPTION OF THE DRAWINGS

The invention will be better understood and other advantages will become evident from a reading of the detailed description given by way of a non-limiting example and with the aid of the figures, in which.

DETAILED DESCRIPTION

Figure 1:
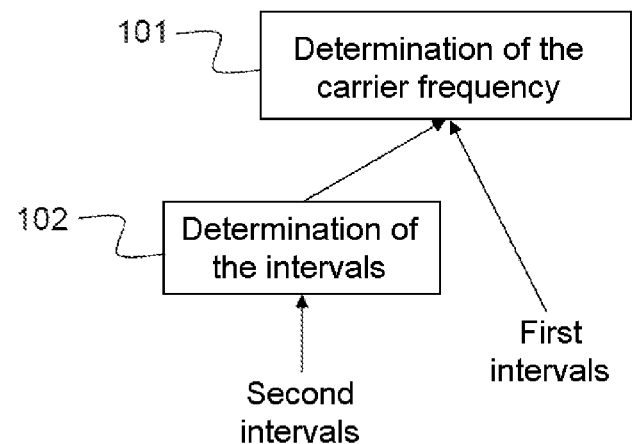
FIG. 1 shows a first embodiment of the system according to one aspect of the invention.
Figure 2:
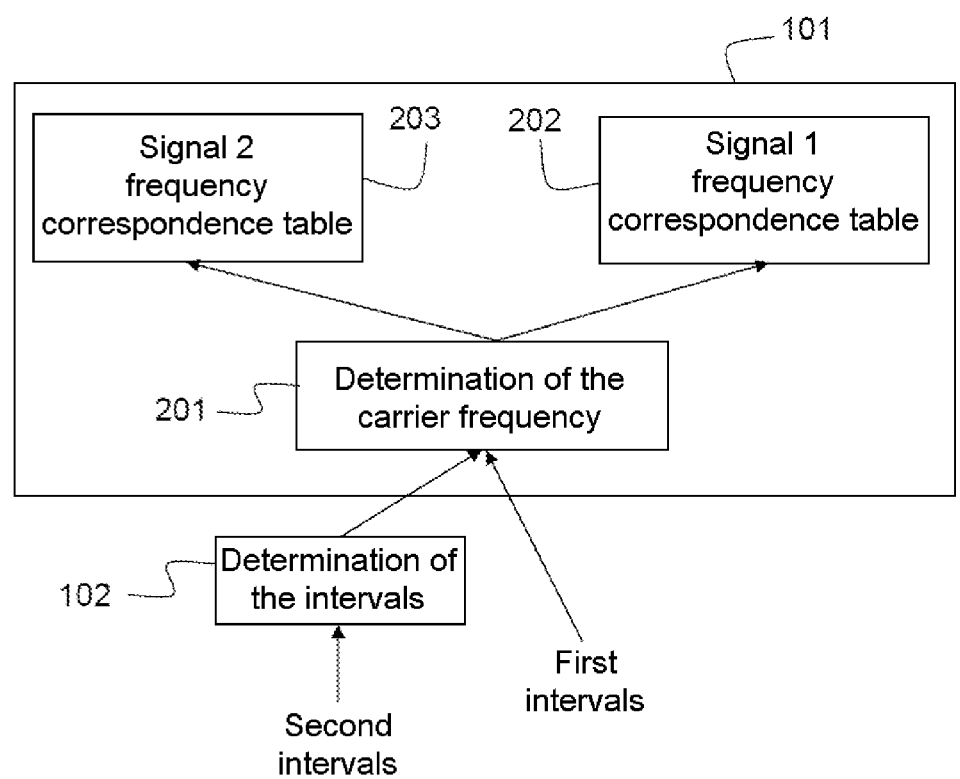
FIG. 2 shows a first embodiment of means for determining the carrier frequency.

The system as shown in FIG. 1 presents a first device 101 responsible for determining, at a given time, the carrier frequencies respectively associated with the transmission of two signals sharing the same spectrum-spreading band. The first signal is associated with a first sequence of time intervals of duration T1 and the second signal is associated with a second sequence of time intervals of duration T2. The device for determining the frequency is described in a more precise manner in FIG. 2. This device for determining the frequency of the carrier comprises, inter alia, a module 201 for generating a pseudo-random number and a first table 202 establishing a correspondence between a pseudo-random number and a first carrier frequency for the first signal, and a second table 203 establishing a correspondence between a pseudo-random number and a second carrier frequency for the second signal. The first and the second carrier frequencies are different for an identical pseudo-random number. The module 201 for generating pseudo-random numbers carries out this generation on the basis of one time interval or a plurality of continuous and consecutive time intervals belonging to the first sequence of time intervals. The system also comprises a second device 102 responsible for determining, for a time interval of the second sequence of time intervals, one or more continuous and consecutive time intervals of the first sequence of time intervals.

This determination is carried out by establishing a correspondence between each end of said second interval and an interval of said first sequence including this end. If necessary, the time intervals included between the two extreme time intervals are determined. This device therefore allows a second time interval belonging to the second sequence and first time intervals belonging to the first sequence to be related. These first time intervals are then used by the first device 101 in order to obtain the carrier frequency used by the second signal.

The system comprising the devices 101 and 102 therefore allows the same pseudo-random numbers to be generated at a given time, by using either the first sequence of intervals or the second sequence of intervals. And, through construction of the table establishing the correspondence between the pseudo-random number and first and second carrier frequencies, said system allows different carrier frequencies to be determined for the two signals.

The second determination device uses the following relations to establish the correspondence:

$$\begin{cases} M = PPCM(T1, T2) \\ a = M/T2 \\ d = k \% a \\ P = EntirePart(((d+1)*T2-1)/T1) - EntirePart(d*T2/T1) \\ MH1 = EntirePart(k*T2/T1) \end{cases}$$

in which T1 represents the duration of each of the first intervals of the first sequence, T2 represents the duration of each of the second intervals of the second sequence, k represents the ordinal index of said chosen second time interval, P represents the total number of said first time intervals, and MH1 represents the number of said first time interval.

PPCM(x, y) is the least common multiple of the two non-zero integers x and y and represents the smallest strictly positive integer which is both a multiple of x and a multiple of y.

y % x represents the remainder of the Euclidean division of x by y.

EntirePart(x) represents the entire part of x, i.e. the integer which is immediately less than or equal to x.

Figure 3:
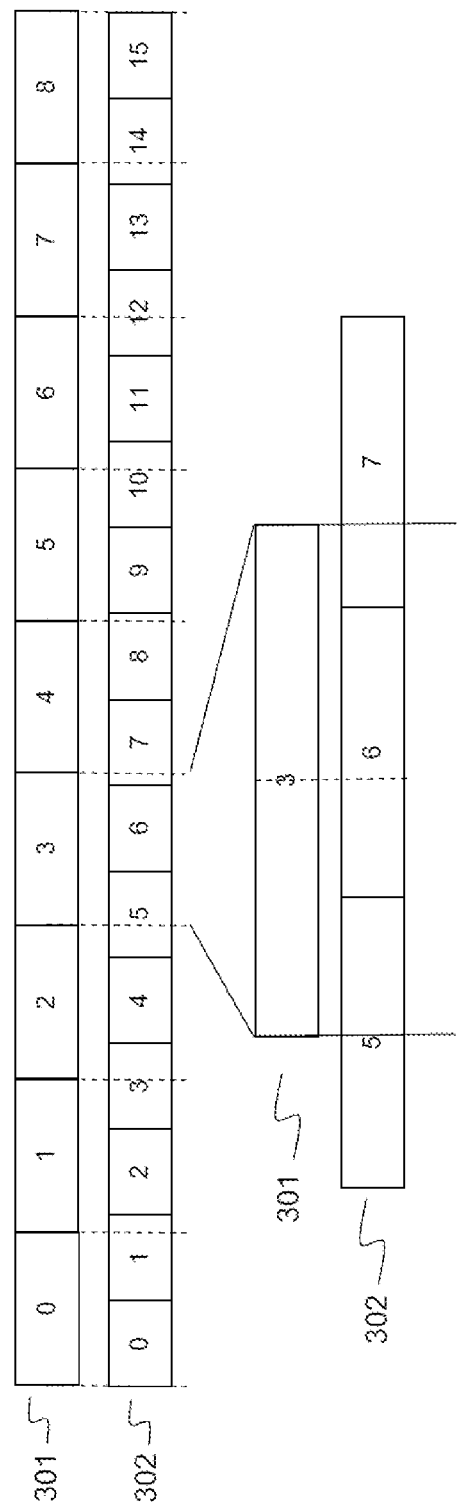
FIG. 3 shows a second embodiment of the system according to one aspect of the invention.

FIG. 3 shows an embodiment in which the first signal is associated with the first sequence 301 of time intervals and the second signal is associated with a second sequence 302 of time intervals. It is assumed that the mechanism for determining the carrier frequency carries out this determination on the basis of intervals of the first sequence. It can be seen in a graphic manner that when the second signal is in the time interval number 1 of the second sequence, this time interval has an end falling in the time interval number 1 of the first sequence of time intervals, and the other end falling in the time interval number 3 of the first sequence of time intervals. These two time intervals of the first sequence are not consecutive, so that intermediate time intervals need to be identified. The person skilled in the art can easily identify this/these intermediate time interval(s), which, in the present example, is the time interval number 2. When these time intervals of the first sequence have been identified, they serve to determine the carrier frequencies which the second signal must use during a time interval of the second sequence of time intervals. This determination of the carrier frequencies is carried out by the device 101. In this device, the module 201 for generating pseudo-random numbers is based on the intervals number 1, 2 and 3 of the first sequence of time intervals in order to generate the pseudo-random numbers corresponding to the interval number 1 of the second sequence 302. The use of the second table 202 then allows a correspondence to be established between the pseudo-random numbers and the second carrier frequencies used by the second signal. During this time lapse, the first signal uses the module 201 for generating pseudo-random numbers on the basis of the same intervals of the first sequence of time intervals. The pseudo-random numbers generated for the first signal are therefore identical to those generated for the second signal. Due to the construction of the first and second table 202 and 203, the first carrier frequency used by the first signal and the second carrier frequency used by the second signal are different and therefore the two signals cannot interfere with one another.

By way of a non-limiting example, the numerical application of the relations establishing the correspondence between the intervals of the first and the second sequence of intervals, by using the parameters of FIG. 3, is as follows:

$$\begin{cases} M = PPCM(T1, T2) \\ a = M/T2 \\ d = k \% a \\ P = EntirePart(((d+1)*T2-1)/T1) - EntirePart(d*T2/T1) \\ MH1 = EntirePart(k*T2/T1) \end{cases}$$

where:
T1 is set at 144
T2 is set at 256
Giving the following result:
M is equal to 2304
a is equal to 9.

The relation between an interval of the sequence 302 and the corresponding intervals of the sequence 301 is then given by the table below:

| Interval number, sequence 302 (k) | d = k % a | Number of intervals, sequence 301 (P) | First interval, sequence 301 (MH1) |
|---|---|---|---|
| 0 | 0 | 2 | 0 |
| 1 | 1 | 3 | 1 |
| 2 | 2 | 3 | 3 |
| 3 | 3 | 3 | 5 |
| 4 | 4 | 2 | 7 |
| 5 | 5 | 3 | 8 |
| 6 | 6 | 3 | 10 |
| 7 | 7 | 3 | 12 |
| 8 | 8 | 2 | 14 |

The invention claimed is:

1. A system for modifying the carrier frequency of a first signal associated with a first sequence of consecutive time intervals of duration T1 and of a second signal associated with a second sequence of consecutive time intervals of duration T2, comprising:
   first means for determining two carrier frequencies respectively associated with each of the two signals on the basis of one time interval or at least two consecutive and continuous time intervals, said time interval(s) belonging to a sequence of consecutive time intervals of known duration, and
   second means for determining a first time interval or at least two first consecutive time intervals belonging to the first sequence, on the basis of a second time interval belonging to the second sequence, by establishing a temporal correspondence between each end of said time interval of said second sequence and an interval of said first sequence including this end,
   wherein the first determination means are suitable for determining said carrier frequencies in a synchronized manner for said first and second signals and on the basis of one time interval or at least two consecutive time intervals, said time interval(s) belonging to said first sequence,
   and wherein the second determination means comprise calculation means suitable for calculating said time interval(s) determined by the following relations:

$$\begin{cases} M = PPCM(T1, T2) \\ a = M/T2 \\ d = k \% a \\ P = EntirePart(((d+1)*T2-1)/T1) - EntirePart(d*T2/T1) \\ MH1 = EntirePart(k*T2/T1) \end{cases}$$

wherein T1 represents the duration of each of the first intervals of the first sequence, T2 represents the duration of each of the first intervals of the second sequence, k represents the number of said second time interval, P represents the number of said first time intervals, and MH1 represents the number of said first time interval, PPCM(x,y) is the least common multiple of two non-zero integers x and y and represents the smallest strictly positive integer which is both a multiple of x and a multiple of y, y % x represents the remainder of the Euclidean division of x by y and EntirePart(x) represents the entire part of x, i.e. the integer which is immediately less than or equal to x.

2. A method for modifying the carrier frequency of a first signal associated with a first sequence of consecutive time intervals of duration T1 and of a second signal associated with a second sequence of consecutive time intervals of duration T2, comprising:
   determining a first time interval or at least two first consecutive time intervals belonging to the first sequence, on the basis of a second time interval belonging to the second sequence, by establishing a temporal correspondence between each end of said time interval of said second sequence and an interval of said first sequence including this end, said time intervals being determined using the following relation:

$$\begin{cases} M = PPCM(T1, T2) \\ a = M/T2 \\ d = k \% a \\ P = EntirePart(((d+1)*T2-1)/T1) - EntirePart(d*T2/T1) \\ MH1 = EntirePart(k*T2/T1) \end{cases}$$

wherein T1 represents the duration of each of the first intervals of the first sequence, T2 represents the duration of each of the first intervals of the second sequence, k represents the number of said second time interval, P represents the number of said first time intervals, and MH1 represents the number of said first time interval, PPCM(x,y) is the least common multiple of two non-zero integers x and y and represents the smallest strictly positive integer which is both a multiple of x and a multiple of y, y % x represents the remainder of the Euclidean division of x by y and EntirePart(x) represents the entire part of x, i.e. the integer which is immediately less than or equal to x, and
   determining two carrier frequencies in a synchronized manner for said first and second signals and respectively associated with each of the two signals on the basis of one time interval or at least two consecutive time intervals, said time interval(s) belonging to said first sequence.

* * * * *